May 18, 1965 A. CLEMENTS 3,183,828
APPARATUS FOR LOADING DIES IN PRESSES
Filed March 11, 1964 4 Sheets-Sheet 1
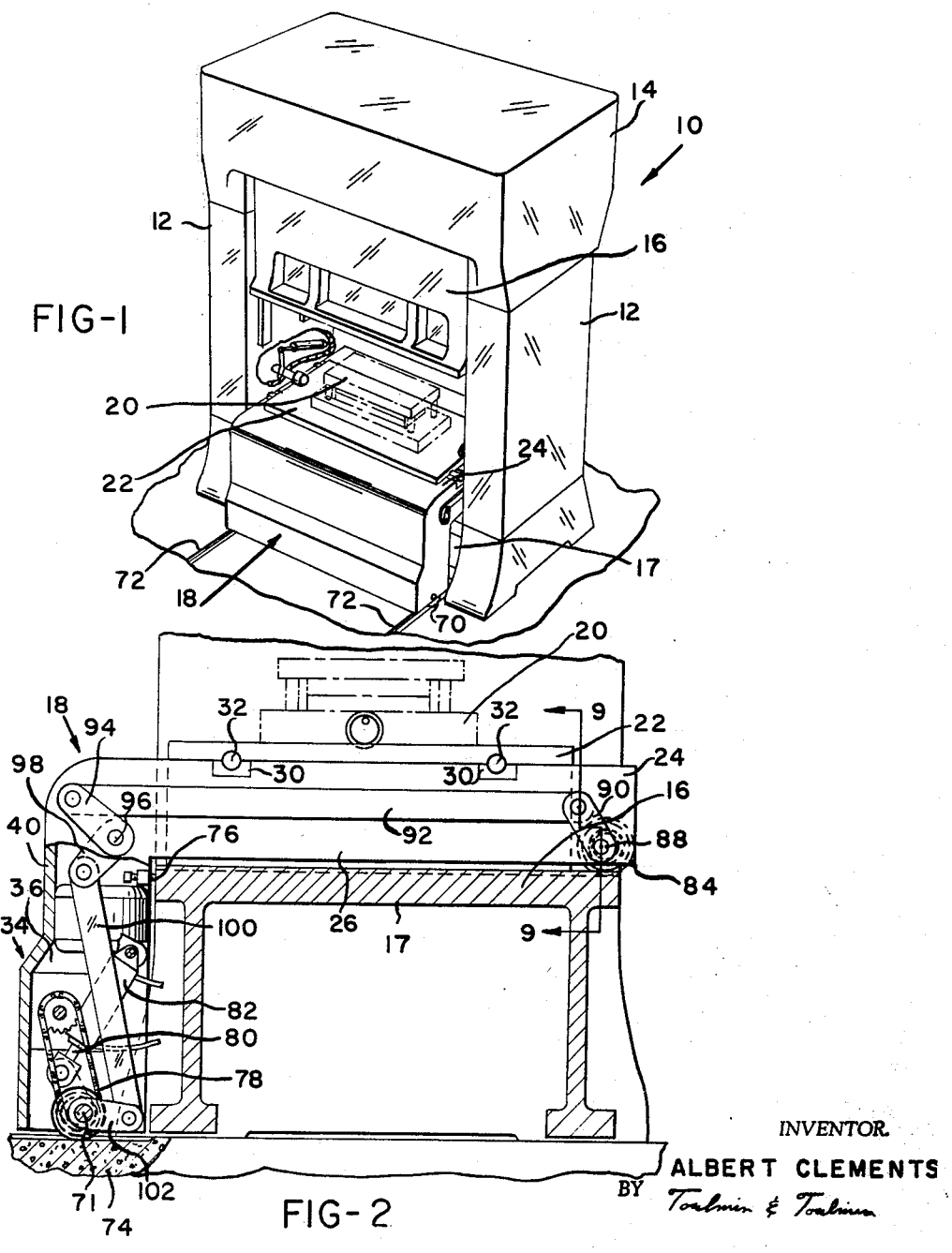
INVENTOR.
ALBERT CLEMENTS
BY Toulmin & Toulmin
ATTORNEYS May 18, 1965   A. CLEMENTS   3,183,828
APPARATUS FOR LOADING DIES IN PRESSES
Filed March 11, 1964   4 Sheets-Sheet 2

INVENTOR.
ALBERT CLEMENTS
BY Toulmin & Toulmin
ATTORNEYS

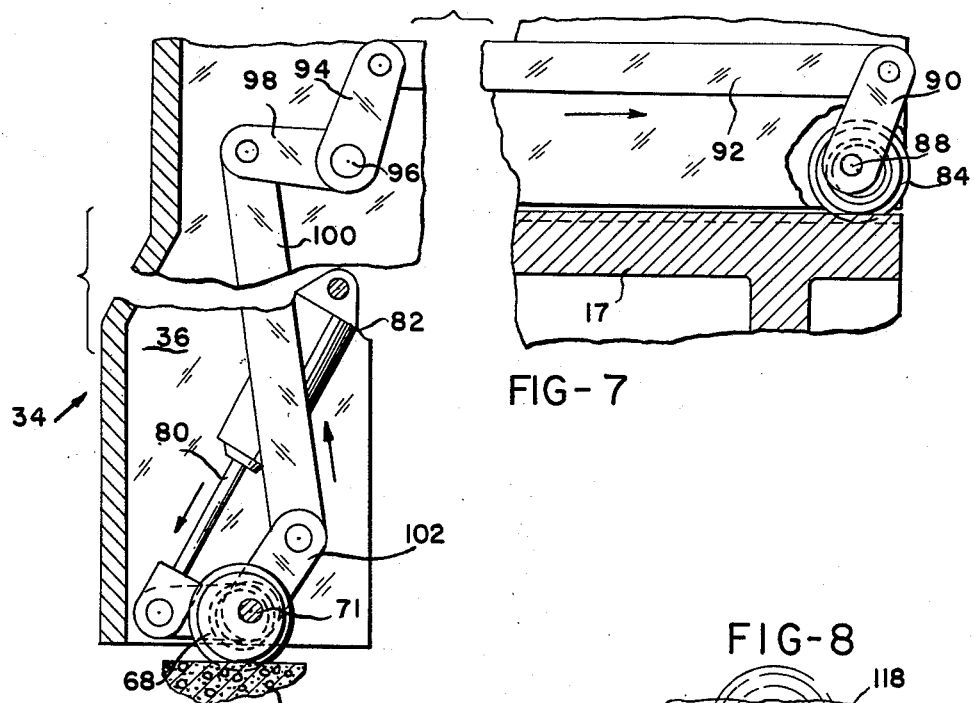
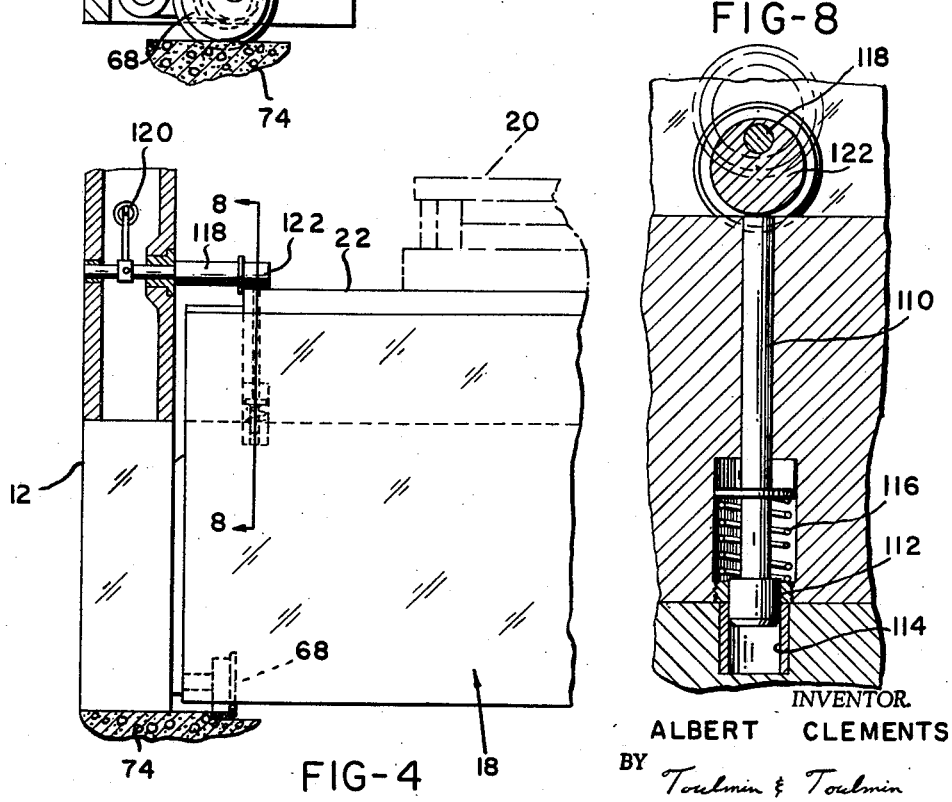

May 18, 1965　　　　A. CLEMENTS　　　3,183,828
APPARATUS FOR LOADING DIES IN PRESSES
Filed March 11, 1964　　　　　　　　4 Sheets-Sheet 4
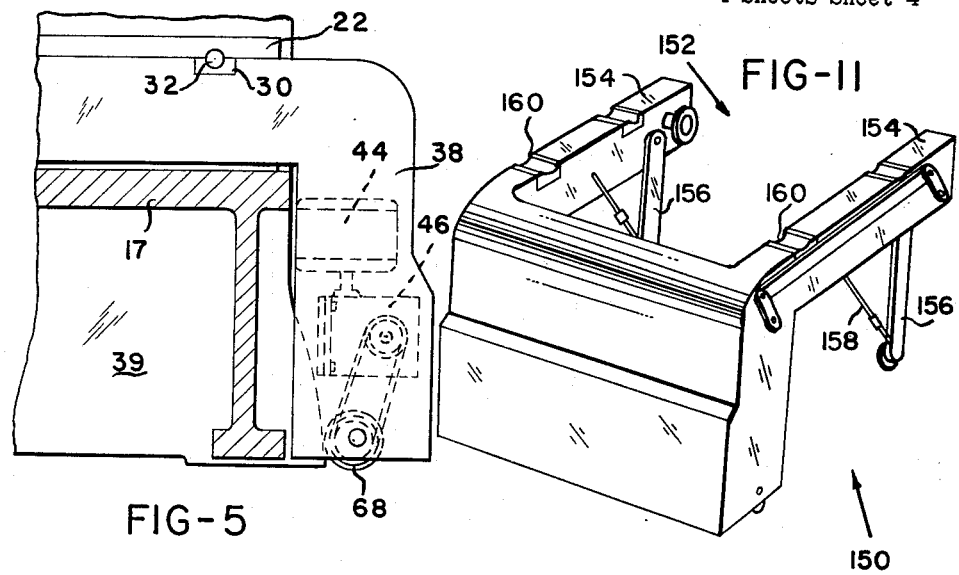
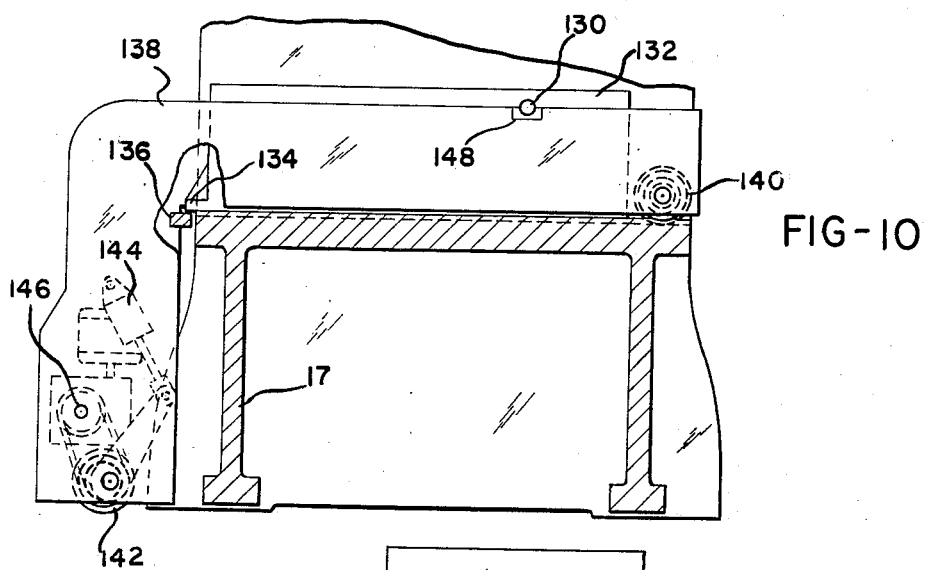
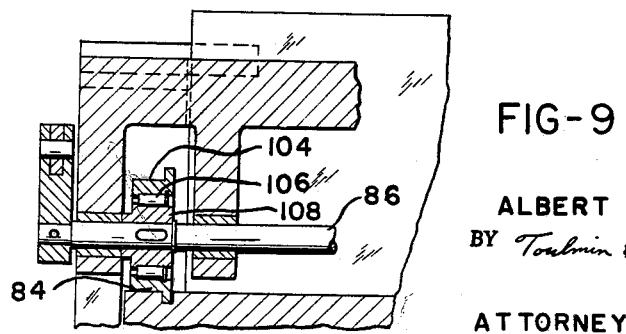
INVENTOR.
ALBERT CLEMENTS
BY Toulmin & Toulmin
ATTORNEYS

United States Patent Office 3,183,828
Patented May 18, 1965

3,183,828
APPARATUS FOR LOADING DIES IN PRESSES
Albert Clements, Hamilton, Ohio, assignor to The Minster Machine Company, Minster, Ohio, a corporation of Ohio
Filed Mar. 11, 1964, Ser. No. 351,172
13 Claims. (Cl. 100—229)

This invention relates to an arrangement for loading and unloading die sets in a press, and more particularly to an apparatus of this nature constructed in such a manner as to be adaptable for use with new press construction as well as with existing presses.

In pressworking operations it is frequently required to change from one production run to another. In accomplishing this "changeover," removal of the one die set from the press is necessary prior to placing of another dies set in the press. Small die sets present no problems, other than alignment, but it will be appreciated that in presses of large tonnage, the die sets will generally be large and heavy and can present considerable difficulties in handling and proper positioning in the press when a "changeover" operation is required. Such an operation is necessarily time consuming and costly, requiring considerable "down-time" of the press, when performed in the usual manner.

To overcome the aforementioned difficulties, die set loading apparatus of the sliding bolster type has come into existence. Such apparatus, however, is generally permanently associated with a specially designed press, and therefore is not only expensive but cannot be readily moved about from press to press and, further, requires elaborate controls for the proper functioning thereof.

The apparatus of the present invention for loading die sets overcomes these and other difficulties frequently encountered in present die sets loading apparatus.

An object of the present invention is the provision of an apparatus for loading die sets into presses which may be readily moved from press to press for use therewith as the occasion may arise.

Another object of the present invention is the provision of a simple inexpensive apparatus for loading die sets into presses which may be readily adapted to existing presses.

A further object of the present invention is the provision of an apparatus for loading dies which need not be an integral part of the press to be used therewith.

Still another object of the present invention is the provision of an apparatus for loading dies wherein the minimum of controls are necessary and wherein all the said controls are conveniently located within the apparatus itself.

A further object of the present invention is the provision of an apparatus for loading dies which is economically constructed and easily maintained and which requires a minimum of parts.

Another object of the present invention is the provision of an apparatus for loading dies which requires a minimum of alteration of existing presses for use therewith.

Other objects and advantages will become more apparent upon reference to the following specification taken in connection with the accompanying drawings, wherein:

FIGURE 1 is a perspective view illustrating fore or less diagrammatically the apparatus of the present invention in operative position within an upright press of conventional construction.

FIGURE 2 is a side elevational view partially in section illustrating the actuating means associated with the present invention and is taken along line 2—2 of FIGURE 3.

FIGURE 4 is a fragmentary elevational view partially in section of the left side of the press showing the arrangement for clamping and locating the bolster plate securely on the bed of the press after the die loader has positioned the die in the press and the die has been securely clamped to the bolster plate.

FIGURE 5 is a sectional view of the press bed taken on line 5—5 of FIGURE 3.

FIGURE 7 is an enlarged fragmentary view showing the actuating means of the present invention during the operation of removing the bolster from the bed of the press.

FIGURE 8 is a fragmentary sectional view of the locating and camming means for positioning and securing the bolster plate to the press bed and is taken on line 8—8 of FIGURE 4.

FIGURE 9 is an enlarged fragmentary sectional view illustrating the manner of guiding the present invention on the press bed and the actuating means associated therewith and indicated on line 9—9 of FIGURE 2.

FIGURE 10 is a modification of the present invention illustrating another arrangement whereby dies may be loaded and unloaded from a press.

FIGURE 11 is a schematic perspective view showing a modified arrangement of the device which can be made entirely self supporting so that it can be moved from press to press.

Figure 3:
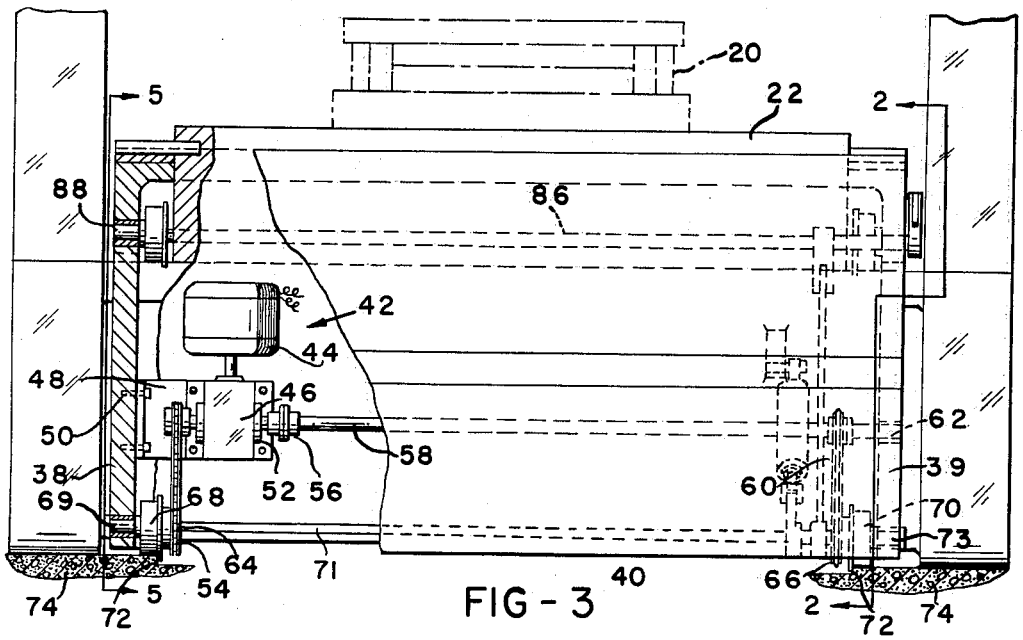
FIGURE 3 is a front elevational view partially in section of the present invention and showing the drive means therefor as viewed when looking into the front of the press of FIGURE 1.
Figure 6:
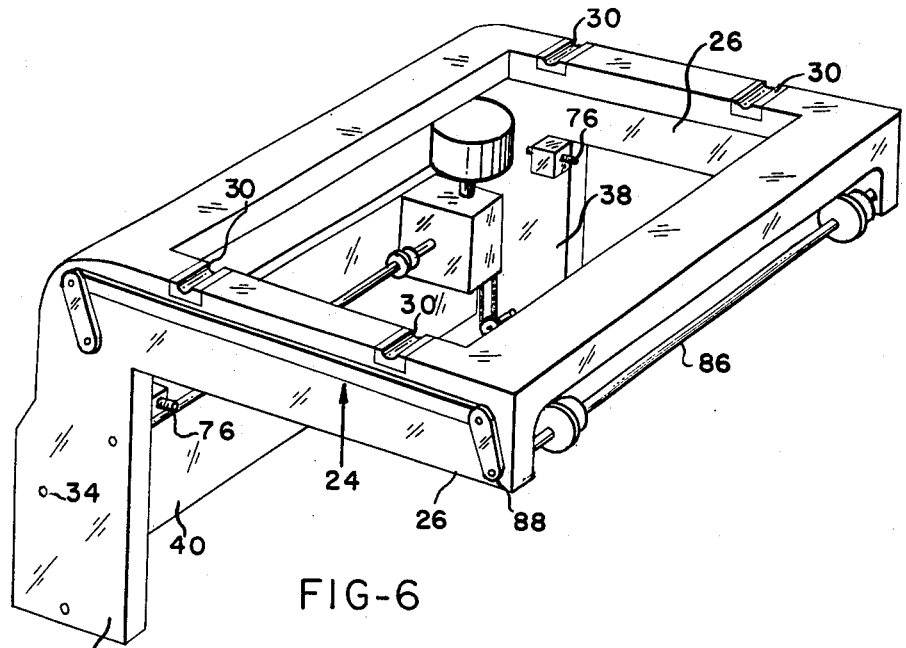
FIGURE 6 is a perspective view of the die loader removed from the press showing the location of the drive unit including actuating means and other parts associated therewith to form the construction of the present invention.

Referring to the drawings, FIGURE 1 illustrates a substantially conventional press construction, generally indicated at 16; and having spaced uprights 12, a head portion 14, a slide 16 reciprocable between the uprights 12, a bed 17.

Positioned so as to extend into the region of the pressworking space between the uprights 12 of the press 10 is an apparatus, generally indicated at 18, constructed according to the present invention for loading die sets into and unloading die sets from the working area of the press bed 17.

A die set 20, in phantom lines, is shown bolted in working position on bolster plate 22 which rests on bed 17 of the press, FIGURES 1 through 4, inclusive.

The apparatus 18 of the present invention comprises a horizontally extending portion 24 arranged for positioning between the uprights 12 of the press 10 as seen in FIGURE 1. The said portion 24 comprises side rail members 26 having recessed therein on top, bearing blocks 30 for engaging the undersides of pins 32 mounted in bolster plate 22, FIGURE 2. At the end of the portion 24, in front of the press, is a vertically depending portion generally indicated at 34 forming a front leg for the device and also forming an enclosure 36 for the various members provided for carrying out the functional operations of the die loader. The enclosure 36 is provided with side walls 38 and 39 and a front wall 40.

A drive means, generally indicated at 42 comprises an electric motor 44 drivingly connected to a speed reduction unit 46. The speed reduction unit 46 is mounted on a plate 48 secure to end wall 38 as by bolt means 50, FIGURE 3. Extending from either side of the speed reduction unit 46 is a shaft member 52, one end of which is provided with drive sprocket and chain means 54. The other end of shaft 52 is coupled by coupling means 56 to extension shaft 58, shaft 58 being provided at its opposite end with drive sprocket and chain means 60. The extreme part of the said opposite end of shaft 58 is journalled in side wall 39 of the enclosure 36 by bearing at 62.

Drive sprocket and chain means 54 and 60 provide drive means for sprockets 64 and 66 keyed to wheels 68 and 70 respectively. The wheels 68 and 70 are rotatably journalled on shaft 71 having end portions 69 and 73 respectively, which are rotatable in the respective side walls respectively. The wheels 68 and 70 are rotably jourfloor 74 and providing guideways for the die loading apparatus 18 when moving in and out of the press during the loading and unloading of dies.

Adjustable stop means 76 provides for a predetermined limit of movement of the die loading apparatus 18 within the press 10 as illustarted in FIGURE 2.

Shaft 71 is adapted for being rotated by an arm 78 attached thereto which is connected to the ram 80 of a fluid motor which comprises also a cylinder 82 pivotally mounted in the device. When the fluid motor is actuated and shaft 71 is rotated eccentric portions keyed to the shaft and located in the wheels cause the wheels 68 and 70 to move downwardly and thereby elevate the front end of the device an amount which will be determined by the eccentricity of the said portions.

The rear end of the device within the press frame is also provided with wheels 84, one on each side, and these wheels are rotatable on a shaft 86 having end portions 88 rotatable in the side portions of the device and located eccentrically relative to the axis of rotation of the wheels. Shaft 86 has one of its end portions 88 connected to an arm 90, which is, in turn, connected to a link 92 extending forwardly of the device and, in turn, connected to a lever arm 94. Lever arm 94 is mounted on a shaft 96 and, inside the housing of the device, shaft 96 carries another lever arm 98 connected by a link 100 with still another lever arm 102 fixed to shaft 71.

It will be perceived that actuation of the fluid motor 82 to rotate shaft 71 to move wheels 68 and 70 downwardly will be accompanied by corresponding downward movement of back wheels 84 so that the entire device will be lifted in parallelism with itself. When the device is so lifted, the open bearing portions 30 will engage beneath pins 32 of bolster plate 22 and lift the bolster plate, together with the die set thereon, upwardly from the bed of the press so that the entire assembly can easily be rolled toward the front of the press and the die removed from the bolster plate. The mounting of a die set in the press will be carried iut in the same manner except with the steps being in the reverse order.

The front and back movement of the device can be accomplished by reversibly energizing motor 44 which will drive front wheels 68 and 70 in one direction or the other and thereby move the device in and out of the press.

The aforementioned wheels 68 and 70 and 84 are preferably of the type illustrated in FIGURES 7 and 9. Each wheel has an outer flanged rim part 104. This rim part is carried by bearing means 106 on an eccentric member 108 keyed to the pertaining support shaft. In FIGURE 9 the support shaft is shaft 86 and the particular wheel illustrated is one of wheels 84. The wheels 68 and 70 at the front of the machine are arranged on shaft 71 in the same manner except that the flanged rim 104 also has fixed thereto a sprocket engaged by the pertaining drive chain.

For precisely locating the bolster plate in the press and for locking it in position, a number of devices can be employed, but there is shown in FIGURES 4 and 8 one way in which this can be accomplished. The bolster plate is provided with one or more pins 110 on each side having pilot end portions 112 receivable in bushings 114 in the press bed. Springs 116 urge the pin upwardly toward position to disengage end portions 112 from bushings 114.

Each side member of the press carries cam means 118 rotatable by hydraulic means 120 connected thereto and said cam means 118 comprising an eccentric end portion 122.

When the cam means are rotated to the FIGURE 8 position thereof, the pins are pressed downwardly and enter bushings 114 and thereby locate the bolster plate on the press bed. The cam means also clamps the bolster plate to the press bed.

By rotating the cam means to the dotted line position in FIGURE 8, the pins will be released and the bolster plate can then be lifted and moved from the press. Other ways of clamping the bolster plate to the press bed and locating it thereon will suggest themselves to those skilled in the art.

In the arrangement thus far described, the device according to the present invention is more or less permanently associated with a given press. Also, it can be moved from one press to the other with little effort. Furthermore, only a minor amount of modification of existing press structures is necessary for receiving a device according to this invention.

In FIGURE 10 there is shown a modification in which the lifting of the bolster plate is accomplished in a slightly different manner.

In the first-mentioned modifications, the bolster plate carried two pins 32 at each side, whereas, in the modification of FIGURE 10 only a single support pin 130 is required on each side of the bolster plate 132. At the front edge of the bolster plate, however, there is provided integral therewith or attached thereto a lug element 134 positioned over a corresponding lug or bar or like abutment 136 carried in the frame 138 of the device, according to the present invention.

At the back end of the device are the support wheels 140 which are not eccentrically mounted, whereas, at the front edge of the device are the eccentrically mounted support wheels 142 that can be elevated by fluid motor 144 and which can be driven by drive means 146.

In the FIGURE 10 arrangement when fluid motor 144 is actuated to move wheels 142 downwardly, the front end of the device lifts upwardly and picks up bolster plate 132 by means of lug 134. At about the same time, pins 130 will be engaged by the bearing means 148 of the device so that the bolster is engaged at two spaced places by the device and lifted upwardly, the entire assembly pivoting about the axes of back wheels 140. After the bolster has been elevated, the device together with the bolster plate can easily be rolled into and out of the press in the same manner as already described.

In FIGURE 11 I show a modification in which the device 150 illustrated has an open back 152. The side rail portions 154 of the device are provided with collapsing legs 156 and collapsible supporting brace means 158. With the arrangement of FIGURE 11, the device can be moved about from press to press by detaching it from the bolster plate on a particular press, and withdrawing it from a press, then lowering the legs 156 and moving the device to a new location.

The modification of FIGURE 11 would, of course, be required to have sufficient movement in the vertical direction to effect complete disengagement of the bolster supporting pins from the open bearing portions 160, provided therefor, but in other respects construction of this modification could be the same as those already described.

It will be understood that this invention is susceptible to modification in order to adapt it to different usages and conditions and accordingly, it is desired to comprehend such modifications within this invention as may fall within the scope of the appended claims.

I claim:

1. A device for changing dies in a vertical press having a bed and a bolster resting on the bed and supporting the press die comprising; a frame having a horizontally extending portion adapted to be inserted over the bed into the working space of the press, a vertical portion depending from one end of said horizontal portion, said horizontal portion having side parts and being adapted to receive the press bolster between said side parts, means on the bottom of the said vertical portion and on the bottom of the other end of said horizontal portion moveably supporting said frame, means carried by the frame operable to raise and lower at least said horizontal portion of the frame, and means on the frame for engaging said bolster on opposite sides of the center of gravity thereof to lift the same from the bed of the press when said horizontal portion is raised while setting the bolster down on the press bed when said horizontal portion is lowered.

2. A device for changing dies in a vertical press having a bed and a bolster resting on the bed and supporting the press die comprising; a frame having a horizontally extending portion adapted to be inserted over the bed into the working space of the press, a vertical portion depending from one end of said horizontal portion, said horizontal portion having side parts and being adapted to receive the press bolster between said side parts, wheels on the bottom of said vertical portion and on the bottom of the other end of said horizontal portion for rollingly supporting said frame, means in the frame for moving at least some of said wheels vertically on the frame to lift and lower at least said horizontal portion, said bolster having means fixed thereto on opposite sides of the center of gravity of the bolster for lifting the bolster off the press bed and means on the said frame for engagement beneath said means fixed to the bolster to lift the bolster from the press bed when said horizontal portion is lifted and to lower the bolster to the press bed when said horizontal portion is lowered.

3. A device for changing dies in a vertical press having a bed and a bolster resting on the bed and supporting the press die comprising; a frame having a horizontally extending portion adapted to be inserted over the bed into the working space of the press, a vertical portion depending from one end of said horizontal portion, said horizontal portion having side parts and being adapted to receive the press bolster between said side parts, wheels on the bottom of said vertical portion and on the bottom of the other end of said horizontal portion for rollingly supporting said frame, eccentric means in the frame supporting at least some of said wheels and rotatable for selectively lifting and lowering at least the horizontal portion thereof, said bolster having means thereon forming downwardly facing lift surfaces, and means on the said horizontal portion spaced vertically beneath the said lift surfaces on said bolster when said horizontal portion is lowered but engageable with the bolster said lift surfaces on the bolster when said horizontal portion is lifted thereby to lift the bolster from the press bed.

4. A device for changing dies in a vertical press having a bed and a bolster resting on the bed and supporting the press die comprising; a frame having a horizontally extending portion adapted to be inserted over the bed into the working space of the press, a vertical portion depending from one end of said horizontal portion, said horizontal portion having side parts and being adapted to receive the press bolster between said side parts, wheels on the bottom of said vertical portion and on the bottom of the other end of said horizontal portion for rollingly supporting said frame, eccentric means in the frame supporting at least the wheels on the bottom of said vertical portion and rotatable for causing vertical movement of said wheels in the frame to cause lifting and lowering movement of at least the said horizontal portion of the frame relative to said bed, said bolster having means thereon forming downwardly facing lift surfaces, and means on the said horizontal portion beneath the said lift surfaces on said bolster and spaced vertically therefrom a predetermined distance when said horizontal portion is lowered, said distance being less than the amount of lifting movement of said horizontal portion.

5. A device for changing dies in a vertical press having a bed and a bolster resting on the bed and supporting the press die comprising; a frame having a horizontally extending portion adapted to be inserted over the bed into the working space of the press, a vertical portion depending from one end of said horizontal portion, said horizontal portion having side parts and being adapted to receive the press bolster between said side parts, wheels on the bottom of said vertical portion and on the bottom of the other end of said horizontal portion for rollingly supporting said frame, eccentric means in the frame supporting at least the wheels on the bottom of said vertical portion and rotatable for causing vertical movement of said wheels in the frame to cause lifting and lowering movement of at least the said horizontal portion of the frame relative to said bed, said bolster having means thereon forming downwardly facing lift surfaces, means on the said horizontal portion beneath the said lift surfaces on said bolster and spaced vertically therefrom a predetermined distance when said horizontal portion is lowered, said distance being less than the amount of lifting movement of said horizontal portion, reversible drive means in the frame, and means connecting the drive means with at least some of said wheels for moving said frame.

6. A device for changing dies in a vertical press having a bed and a bolster resting on the bed and supporting the press die comprising; a frame having a horizontally extending portion adapted to be inserted over the bed into the working space of the press, a vertical portion depending from one end of said horizontal portion, said horizontal portion having side parts and being adapted to receive the press bolster between said side parts, wheels on the bottom of said vertical portion and on the bottom of the other end of said horizontal portion for rollingly supporting said frame, eccentric means in the frame supporting at least some of said wheels and rotatable for selectively lifting and lowering at least the horizontal portion thereof, said bolster having means thereon forming downwardly facing lift surfaces, means on the said horizontal portion spaced vertically beneath the said lift surfaces on said bolster when said horizontal portion is lowered but engageable with the said lift surfaces on the bolster when said horizontal portion is lifted thereby to lift the bolster from the press bed, and means in the frame selectively operable for rotating said eccentric means therein.

7. The arrangement according to claim 6 wherein said side parts are disconnected at the said other ends thereof for the selective removal of the frame from a press while leaving the bolster in the press.

8. The arrangement according to claim 6 wherein said side parts are disconnected at the said other ends thereof for the selective removal of the frame from a press while leaving the bolster in the press, and collapsible legs carried by said side parts to support the said other ends thereof when the frame is removed from a press.

9. The arrangement according to claim 6 wherein said frame includes adjustable abutment means for engagement with the press to position the frame relative to the press when the frame is moved into the press.

10. The arrangement according to claim 9 which includes means for locating the bolster on the press bed and clamping it thereto.

11. In combination; a vertical press having a bed, a bolster on the bed, and a device for moving the bolster into and out of working position on the bed, said device comprising a frame having horizontal side parts extending along the sides of said bolster and having support wheels at one end, said frame including substantially vertical leg means depending from the other end of said side parts and rigidly interconnecting said side parts, support wheels on the bottom of said leg means, means in said frame selectively operable for moving at least some of said support wheels vertically therein to lift and lower at least said side parts, cooperating elements of abutment means on said bolster and said frame engageable upon movement of said wheels downwardly in the frame to lift the bolster from the press bed, and means in the frame for reversibly driving at least some of said support wheels to move the frame and the bolster supported thereby.

12. The arrangement according to claim 11 wherein said frame and press include cooperating elements of abutment means to limit the movement of the frame when it is advanced into the press.

13. The arrangement according to claim 12 wherein said bolster and bed comprise normally disengaged cooperating elements of key means to locate the bolster on the bed, and means for engaging said key elements and for clamping the bolster to the bed when the bolster is lowered to the bed.

References Cited by the Examiner
UNITED STATES PATENTS

| | | | |
|---|---|---|---|
| 279,695 | 6/83 | Boschert | 100—224 |
| 316,981 | 5/85 | Krueger | 280—43.1 |
| 1,348,903 | 8/20 | Simpson | 214—26 |
| 1,910,267 | 5/33 | Smith et al. | 214—26 |
| 3,059,274 | 10/62 | Fassero et al. | |
| 3,111,100 | 11/63 | Georgeff | 113—49 |

FOREIGN PATENTS 349,398    3/22    Germany.

WALTER A. SCHEEL, *Primary Examiner.*